United States Patent

Yoshinaga et al.

(10) Patent No.: US 10,958,112 B2
(45) Date of Patent: Mar. 23, 2021

(54) LAMINATE OF SOFT MAGNETIC RIBBONS

(71) Applicant: TOYOTA JIDOSHA KABUSHIKI KAISHA, Toyota (JP)

(72) Inventors: Fumitaka Yoshinaga, Toyota (JP); Kazuaki Haga, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 16/256,353

(22) Filed: Jan. 24, 2019

(65) Prior Publication Data

US 2019/0259516 A1 Aug. 22, 2019

(30) Foreign Application Priority Data

Feb. 22, 2018 (JP) .............................. JP2018-029603

(51) Int. Cl.
| | |
|---|---|
| *H02K 1/02* | (2006.01) |
| *H01F 1/153* | (2006.01) |
| *H02K 3/34* | (2006.01) |
| *H02K 1/14* | (2006.01) |
| *H02K 15/10* | (2006.01) |

(52) U.S. Cl.
CPC ............ *H02K 1/02* (2013.01); *H01F 1/153* (2013.01); *H02K 1/14* (2013.01); *H02K 3/345* (2013.01); *H02K 15/10* (2013.01)

(58) Field of Classification Search
CPC ..... H01F 1/153; H01F 41/0226; H02K 3/345; H02K 1/02; H02K 1/14; H02K 15/10; H02K 1/04; H02K 1/17; H02K 15/03; H02K 2201/09

See application file for complete search history.

(56) References Cited

U.S. PATENT DOCUMENTS

| | | | | |
|---|---|---|---|---|
| 6,462,456 | B1* | 10/2002 | DeCristofaro | B82Y 25/00 310/216.004 |
| 2001/0043134 | A1* | 11/2001 | Decristofaro | H01F 41/0226 335/302 |
| 2004/0150285 | A1* | 8/2004 | Decristofaro | H01F 1/15366 310/216.065 |
| 2010/0308679 | A1* | 12/2010 | Yamashita | H02K 1/2733 310/156.45 |
| 2017/0229930 | A1 | 8/2017 | Makino et al. | |

FOREIGN PATENT DOCUMENTS

| | | |
|---|---|---|
| JP | 2003-339128 A | 11/2003 |
| JP | 2005-340691 A | 12/2005 |
| JP | 2007-311652 A | 11/2007 |
| JP | 2012-253918 A | 12/2012 |
| JP | 2014-079101 A | 5/2014 |
| JP | 2017-143251 A | 8/2017 |

\* cited by examiner

*Primary Examiner* — Mohamad A Musleh
(74) *Attorney, Agent, or Firm* — Oliff PLC

(57) ABSTRACT

Provided is a laminate of soft magnetic ribbons having a simple structure and capable of avoiding a damage of the soft magnetic ribbons and improving the occupancy of the soft magnetic ribbons. The laminate of soft magnetic ribbons includes: a laminated part of first soft magnetic ribbons stacked; and a reinforcing part disposed at both ends of the laminated part in the stacking direction of the first soft magnetic ribbons. The reinforcing part includes second soft magnetic ribbons stacked in the stacking direction of the first soft magnetic ribbons and hardening resin that covers the second soft magnetic ribbons as a whole and is impregnated into areas between the neighboring second soft magnetic ribbons.

8 Claims, 2 Drawing Sheets

LAMINATE OF SOFT MAGNETIC RIBBONS

CROSS REFERENCE TO RELATED APPLICATIONS

The present application claims priority from Japanese patent application JP 2018-029603 filed on Feb. 22, 2018, the content of which is hereby incorporated by reference into this application.

BACKGROUND

Technical Field

The present disclosure relates to a laminate of soft magnetic ribbons.

Background Art

Conventionally inventions about the laminate of magnetic plates including soft magnetic ribbons stacked and a motor including such a laminate of magnetic plates as a stator have been known (see JP 2017-143251 A, for example). The invention described in JP 2017-143251 A aims to provide a laminate of magnetic plates having sufficient rigidity and capable of stabilizing the magnetic property when the laminate is fastened for fixing.

To this end, the laminate of magnetic plates according to the invention described in JP 2017-143251 A includes a laminated part, first and second metal plates and a fastening mechanism (see this document, claim 1, for example). This laminated part includes a plurality of stacked soft magnetic ribbons. The first and second metal plates sandwich the laminated part from the upper face and the lower face in the stacking direction. The fastening mechanism penetrates through the first and second metal plates and the laminated part to fasten the laminated part between the first and second metal plates.

This configuration can confine the laminated part of soft magnetic ribbons as a whole with the rigid metal plates in the stacking direction. This can give sufficient rigidity to the laminate and can avoid deflection of the soft magnetic ribbons in the laminated part because the laminate can be pressed at the entire surface, and so can stabilize the magnetic property (see paragraph 0010 of this document).

SUMMARY

Such a conventional laminate of magnetic plates requires an insulating member disposed between the laminated part including the laminate of soft magnetic ribbons and each of the metal plates to sandwich this laminated part from the upper face and lower face. The conventional laminate also requires an insulating member between the neighboring soft magnetic ribbons that are stacked as the laminated part. This conventional laminate of magnetic plates therefore has a problem of the complex structure.

As stated above, this conventional laminate of magnetic plates has the first and second metal plates to sandwich the laminated part from the upper face and the lower face of the laminated part in the stacking direction. When a motor includes this laminate as the stator, the first and second metal plates can protect the laminate of soft magnetic ribbons with low rigidity during insertion of winding into the slot of the stator and bending the winding, and so can avoid a damage of the laminated part during the bending of the winding.

The conventional laminate of magnetic plates, however, has the first and second metal plates that sandwich the laminated part from the upper face and the lower face of the laminated part in the stacking direction, and may decrease in occupancy of the soft magnetic ribbons that is the volume fraction of the soft magnetic ribbons in the laminate. Such a decrease in occupancy of the soft magnetic ribbons in the laminate increases an iron-loss ratio of the metal plates. This results in an increase of iron loss of the laminate, and may degrade the efficiency of the motor.

The present disclosure provides a laminate of soft magnetic ribbons having a simple structure and capable of avoiding a damage of the laminated part of soft magnetic ribbons and improving the occupancy of the soft magnetic ribbons.

A laminate of soft magnetic ribbons according to one aspect of the present disclosure includes: a laminated part of first soft magnetic ribbons stacked; and a reinforcing part disposed at both ends of the laminated part in the stacking direction of the first soft magnetic ribbons. The reinforcing part includes second soft magnetic ribbons stacked in the stacking direction of the first soft magnetic ribbons and hardening resin that covers the second soft magnetic ribbons as a whole and is impregnated into areas between the neighboring second soft magnetic ribbons.

The above aspect includes the stacked second soft magnetic ribbons of the reinforcing part that is covered with the hardening resin as a whole. Such hardening resin can insulate the first soft magnetic ribbon of the laminated part and the second soft magnetic ribbon of the reinforcing part. In this way the laminate does not include an insulating member between the reinforcing part and the laminated part, and so can have a simple structure.

The stacked second soft magnetic ribbons of the reinforcing part is impregnated with the hardening resin disposed between the neighboring second soft magnetic ribbons in the stacking direction, so that the hardening resin insulates these neighboring second soft magnetic ribbons. In this way the laminate does not include an insulating member between the neighboring ribbons of the plurality of second soft magnetic ribbons stacked for the reinforcing part, and so can have a simple structure.

The stacked second soft magnetic ribbons of the reinforcing part as a whole is covered with the hardening resin, and the hardening resin is impregnated into areas between the neighboring second soft magnetic ribbons stacked. With this structure, the plurality of stacked second soft magnetic ribbons of the reinforcing part can be integral with the hardening resin, and so the reinforcing part can have high rigidity due to the rigidity of the hardening resin, which cannot be obtained simply by stacking the first soft magnetic ribbons having very low rigidity.

When a motor includes the laminate of the above aspect as the stator, i.e., as the laminated core, the reinforcing part can protect the laminate of the first soft magnetic ribbons with low rigidity during the step of inserting winding into the slot of laminated core and bending the winding, and so can avoid a damage of the laminated part during bending of the winding. The reinforcing part, which includes the stacked second soft magnetic ribbons, can improve the occupancy of the soft magnetic ribbons that is the volume fraction of the soft magnetic ribbons in the laminate as compared with the structure including metal plates. This results in a decrease of iron loss of the laminate, and so can improve the efficiency of the motor.

In the laminate of soft magnetic ribbons according to the above aspect, the first soft magnetic ribbons and the second soft magnetic ribbons may be the same soft magnetic ribbons. This can reduce the manufacturing cost of the laminate as compared with the structure including different structured soft magnetic ribbons for the first soft magnetic ribbons and the second soft magnetic ribbons.

In the laminate of soft magnetic ribbons according to the above aspect, the laminated part may include an insulating coating between the neighboring first soft magnetic ribbons, and the first soft magnetic ribbons at both ends in the stacking direction may face the hardening resin of the reinforcing part. This insulating coating can insulate the neighboring first soft magnetic ribbons of the laminated part. When a motor includes the laminate as the stator, i.e., as the laminated core, this structure increases the interlaminar resistance between the neighboring first soft magnetic ribbons and so decreases a loss due to eddy current, and can improve the efficiency of the motor.

In the laminate of this aspect, the laminated part includes the first soft magnetic ribbons at both ends in the stacking direction that face the hardening resin of the reinforcing part. That is, in the laminate, the hardening resin that covers the second soft magnetic ribbons of the reinforcing part insulates the first soft magnetic ribbons at both ends of the laminated part and the second soft magnetic ribbons of the reinforcing part. This can eliminate the insulating coating between the reinforcing part and the laminated part, and so can simplify the structure of the laminate as compared with the structure including metal plates disposed at both ends of the laminated part via insulating members.

The present disclosure can provide a laminate of soft magnetic ribbons having a simple structure and capable of avoiding a damage of the laminated part of soft magnetic ribbons and improving the occupancy of the soft magnetic ribbons.

DETAILED DESCRIPTION

The following describes one embodiment of a laminate of soft magnetic ribbons according to the present disclosure, with reference to the drawings.

Figure 1:
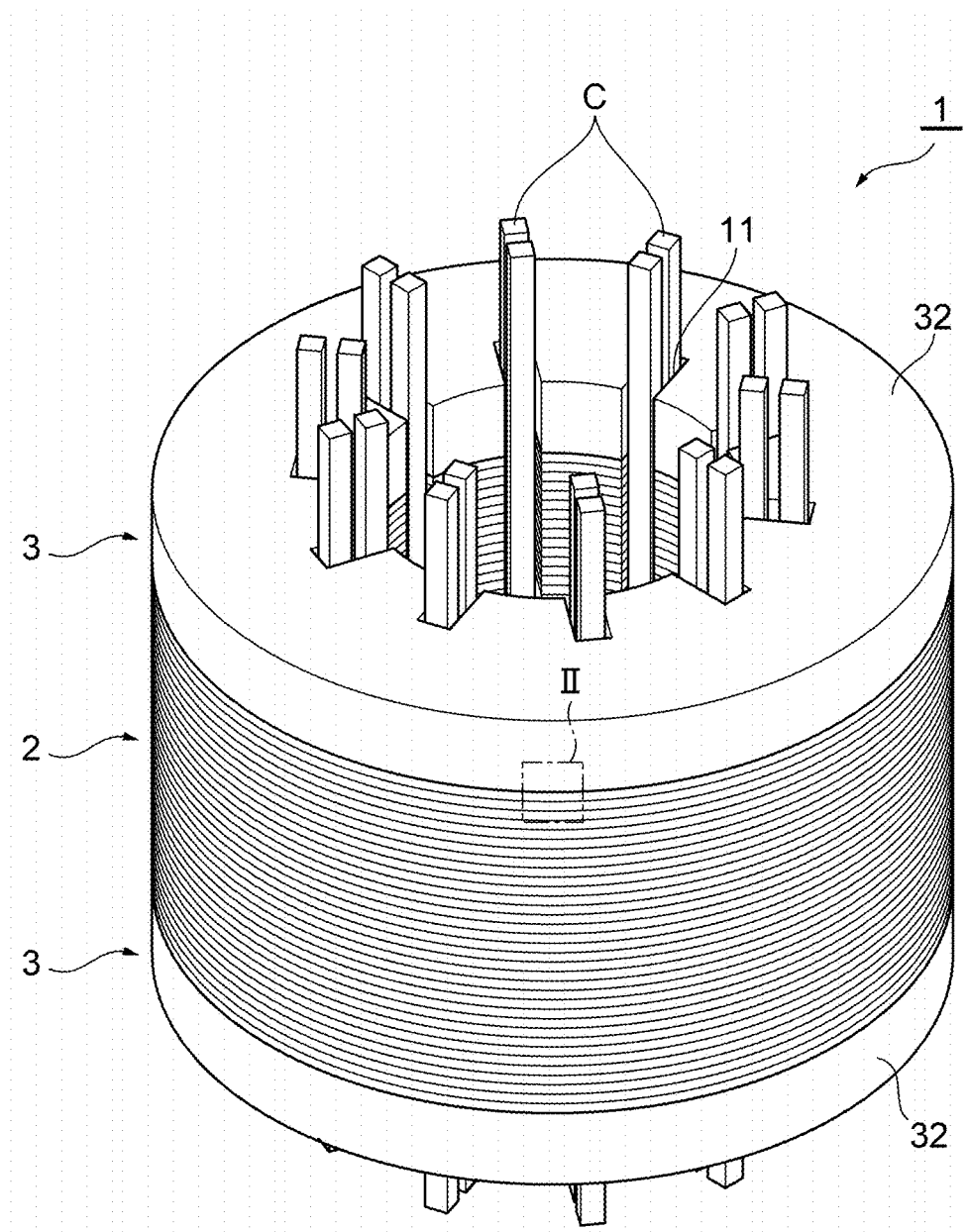
FIG. 1 is a schematic perspective view of a laminate of soft magnetic ribbons according to one embodiment of the present disclosure.
Figure 2:
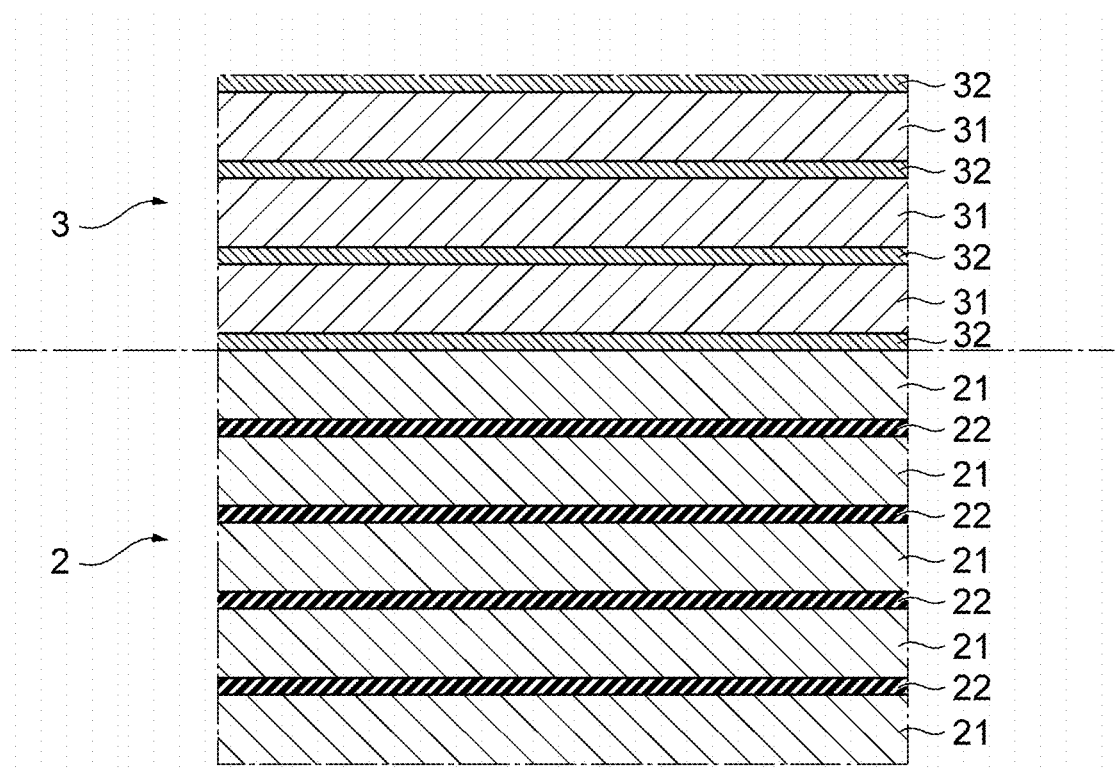
FIG. 2 is a schematic enlarged cross-sectional view of the vicinity of the boundary between a laminated part and a reinforcing part of the laminate of FIG. 1.

FIG. 1 is a schematic perspective view of a laminate 1 of soft magnetic ribbons according to one embodiment of the present disclosure. FIG. 2 is a schematic enlarged cross-sectional view of the vicinity of the boundary between a laminated part 2 and a reinforcing part 3 of the laminate 1 of soft magnetic ribbons in FIG. 1. Specifically FIG. 2 is a schematic enlarged cross-sectional view of a part corresponding to region II in the vicinity of the boundary between the laminated part 2 and the reinforcing part 3 that is surrounded with the dashed-dotted line in FIG. 1.

The laminate 1 of the present embodiment includes the laminated part 2 including first soft magnetic ribbons 21 stacked and a reinforcing part 3 disposed at both ends of the laminated part 2 in the stacking direction of the first soft magnetic ribbons 21. The reinforcing part 3 includes second soft magnetic ribbons 31 that are stacked in the stacking direction of the first soft magnetic ribbons 21 and hardening resin 32 that covers these second soft magnetic ribbons 31 as a whole and is impregnated into areas between the mutually neighboring second soft magnetic ribbons 31.

For example, the first soft magnetic ribbons 21 and the second soft magnetic ribbons 31 are ribbons made of nanocrystalline alloy having an excellent soft magnetic property. The first soft magnetic ribbons 21 and the second soft magnetic ribbons 31 may be ribbons made of nanocrystalline magnetic alloy, which is obtained by preparing alloy ribbons manufactured by a single-roll method and thermal-treating the ribbons, for example. The first soft magnetic ribbons 21 and the second soft magnetic ribbons 31 may have a thickness of 0.01 mm or more and 0.05 mm or less, for example.

The first soft magnetic ribbons 21 and the second soft magnetic ribbons 31 may be soft magnetic ribbons made of the same material and having the same dimensions, shape and properties, i.e., they may be the same soft magnetic ribbons.

The laminated part 2 includes an insulating coating 22 between the neighboring first soft magnetic ribbons 21, for example. Note here that in the laminated part 2, the first soft magnetic ribbons 21 at both ends in the stacking direction of the first soft magnetic ribbons 21 face the hardening resin 32 of the reinforcing part 3. That is, the laminate 1 of the present embodiment does not have the insulating coating 22 between the laminated part 2 and the reinforcing part 3. Note here that the first soft magnetic ribbons 21 at both ends in the stacking direction of the first soft magnetic ribbons 21 of the laminated part 2 and the respective second soft magnetic ribbons 31 of the reinforcing part 3 are insulated by the hardening resin 32 of the reinforcing part 3.

The laminated part 2 may be manufactured by applying an inorganic component or an inorganic+organic component having an insulating property to one of the faces of a first soft magnetic ribbon 21, followed by heating, and stamping the first soft magnetic ribbon into a predetermined shape, and then by stacking a plurality of these first soft magnetic ribbons 21, for example. This can manufacture the laminated part 2 having the insulating coating 22 between neighboring first soft magnetic ribbons 21 and having first soft magnetic ribbons 21 exposed at both ends in the stacking direction. The method for manufacturing the laminated part 2 is not limited especially.

The reinforcing part 3 may be manufactured by stacking a plurality of second soft magnetic ribbons 31 each having a predetermined shape by stamping and immersing these ribbons in hardening resin before hardening, followed by hardening of the hardening resin, for example. This can manufacture the reinforcing part 3 having the neighboring second soft magnetic ribbons 31 impregnated with the hardening resin 32, and the stacked second soft magnetic ribbons 31 as a whole is covered with the hardening resin. The method for manufacturing the reinforcing part 3 is not limited especially.

The hardening resin 32 of the reinforcing part 3 is not limited especially. For example, when a motor includes this laminate 1 as the stator, the hardening resin 32 may be resin that has rigidity enough to avoid a damage of the reinforcing part 3 during the step of inserting winding into a slot 11 of the laminate 1 as the laminated core and bending the winding C, and has an insulating property enough to insulate the neighboring second soft magnetic ribbons 31 of the reinforcing part 3. The reinforcing part 3 may have a thickness in the stacking direction of the second soft magnetic ribbons 31 that is about 10 times the thickness of the second soft magnetic ribbon 31, for example. The thickness can be as small as possible within the range of giving necessary rigidity to the reinforcing part 3.

The following describes the action of the laminate 1 of the present embodiment based on comparison with the conventional laminate of magnetic plates.

As stated above, the conventional laminate of magnetic plates described in JP 2017-143251 A includes a laminated part, first and second metal plates and a fastening mechanism. The laminated part includes a plurality of soft magnetic ribbons stacked, and the first and second metal plates sandwich the laminated part from the upper face and the lower face in the stacking direction. The fastening mechanism penetrates through the first and second metal plates and the laminated part to fasten the laminated part between the first and second metal plates.

The conventional laminate having such a structure requires an insulating member disposed between the laminated part including the laminate of soft magnetic ribbons and each of the metal plates to sandwich this laminated part from the upper face and lower face. The conventional laminate also requires an insulating member between the neighboring soft magnetic ribbons that are stacked as the laminated part. The structure of the laminate is therefore complex.

As stated above, the conventional laminate of magnetic plates has the first and second metal plates to sandwich the laminated part from the upper face and the lower face of the laminated part in the stacking direction. When a motor includes this laminate as the stator, the first and second metal plates can protect the laminate of soft magnetic ribbons with low rigidity during insertion of winding into the slot of the stator and bending the winding, and so can avoid a damage of the laminated part during bending of the winding.

The conventional laminate of magnetic plates, however, has the first and second metal plates that sandwich the laminated part from the upper face and the lower face of the laminated part in the stacking direction, which may decrease in occupancy of the soft magnetic ribbons that is the volume fraction of the soft magnetic ribbons. A metal plate (electromagnetic steel plate) typically has a loss that is about 5 to 10 times the loss of soft magnetic ribbons. The laminate including a metal plate therefore has a larger loss. This results in an increase of iron loss of the laminate, and may degrade the efficiency of the motor.

On the contrary, the laminate 1 of soft magnetic ribbons of the present embodiment includes the laminated part 2 including first soft magnetic ribbons 21 stacked and a reinforcing part 3 disposed at both ends of the laminated part 2 in the stacking direction of the first soft magnetic ribbons 21 as stated above. The reinforcing part 3 includes second soft magnetic ribbons 31 that are stacked in the stacking direction of the first soft magnetic ribbons 21 and hardening resin 32 that covers these second soft magnetic ribbons 31 as a whole and is impregnated into areas between the mutually neighboring second soft magnetic ribbons 31.

In this way the laminate 1 of soft magnetic ribbons of the present embodiment includes the stacked second soft magnetic ribbons 31 of the reinforcing part 3 that is covered with the hardening resin 32 as a whole. Such hardening resin 32 can insulate the first soft magnetic ribbon 21 of the laminated part 2 and the second soft magnetic ribbon 31 of the reinforcing part 3. In this way the laminate 1 of the present embodiment does not need an insulating member between the reinforcing part 3 and the laminated part 2, and so can have a simple structure.

In the laminate 1 of soft magnetic ribbons of the present embodiment, the hardening resin 32 is impregnated into areas between the neighboring second soft magnetic ribbons 31 of the reinforcing part 3 in the stacking direction of the second soft magnetic ribbons 31. This hardening resin 32 can insulate the neighboring second soft magnetic ribbons 31. In this way the laminate 1 of the present embodiment does not need an insulating member between the neighboring soft magnetic ribbons of the plurality of second soft magnetic ribbons 31 stacked for the reinforcing part 3, and so can have a simple structure.

In the laminate 1 of soft magnetic ribbons of the present embodiment, the stacked second soft magnetic ribbons 31 of the reinforcing part 3 as a whole is covered with the hardening resin 32, and the hardening resin is impregnated into areas between the neighboring second soft magnetic ribbons 31 stacked. With this structure, the plurality of stacked second soft magnetic ribbons 31 of the reinforcing part 3 can be integral with the hardening resin 32, and so the reinforcing part can have high rigidity due to the rigidity of the hardening resin 32, which cannot be obtained simply by stacking the first soft magnetic ribbons 21 having very low rigidity.

When a motor includes the laminate 1 of soft magnetic ribbons of the present embodiment as a stator, i.e., as the laminated core, the reinforcing part 3 can protect the laminated part 2 of the first soft magnetic ribbons 21 having low rigidity during the step of inserting winding C into a slot 11 of the laminated core and bending the winding, and so can avoid a damage of the laminated part 2 due to the bending of the winding C. The reinforcing part 3, which includes the stacked second soft magnetic ribbons 31, can improve the occupancy of the soft magnetic ribbons that is the volume fraction of the soft magnetic ribbons in the laminate 1 as compared with the structure including metal plates. This results in a decrease of iron loss of the laminate, and so can improve the efficiency of the motor.

In the laminate 1 of soft magnetic ribbons of the present embodiment, the first soft magnetic ribbons 21 of the laminated part 2 and the second soft magnetic ribbons 31 of the reinforcing part 3 may be the same soft magnetic ribbons. This can reduce the manufacturing cost of the laminate 1 as compared with the structure including different structured soft magnetic ribbons for the first soft magnetic ribbons 21 and the second soft magnetic ribbons 31.

In the laminate 1 of soft magnetic ribbons of the present embodiment, the laminated part 2 includes the insulating coating 22 between the neighboring first soft magnetic ribbons 21, and the first soft magnetic ribbons 21 at both ends in the stacking direction face the hardening resin 32 of the reinforcing part 3 as stated above. This insulating coating 22 can insulate the neighboring first soft magnetic ribbons 21 of the laminated part 2. When a motor includes the laminate 1 as the stator, i.e., as the laminated core, this structure increases the interlaminar resistance between the neighboring first soft magnetic ribbons 21 and so decreases a loss due to eddy current, and can improve the efficiency of the motor.

In the laminate 1 of soft magnetic ribbons of the present embodiment, the laminated part 2 includes the first soft magnetic ribbons 21 at both ends in the stacking direction that face the hardening resin 32 of the reinforcing part 3 as stated above. That is, in the laminate 1, the hardening resin 32 that covers the second soft magnetic ribbons 31 of the reinforcing part 3 isolates the first soft magnetic ribbons 21 at both ends of the laminated part 2 and the respective second soft magnetic ribbons 31 of the reinforcing part 3. This can eliminate the insulating coating 22 between the reinforcing part 3 and the laminated part 2, and so can simplify the structure of the laminate 1 as compared with the structure including metal plates disposed at both ends of the laminated part 2 via insulating members.

As described above, the present embodiment can provide a laminate 1 of soft magnetic ribbons having a simple structure and capable of avoiding a damage of the first soft magnetic ribbons 21 and the second soft magnetic ribbons 31 as soft magnetic ribbons and improving the occupancy of the soft magnetic ribbons.

That is a detailed description of the embodiments of the present disclosure with reference to the drawings. The specific configuration of the present disclosure is not limited to the above-stated embodiment, and the design may be modified variously without departing from the spirits of the present disclosure. The present disclosure also covers such modified embodiments.

EXAMPLES

The following describes examples of the laminate of soft magnetic ribbons according to the present disclosure and comparative examples of the laminate of soft magnetic ribbons for comparison.

Example 1

Ribbons made of nanocrystalline soft magnetic alloy of 0.02 mm in thickness that was a perfect crystal (100%) were used as the first soft magnetic ribbons and the second soft magnetic ribbons, and a stator (laminated core) including a laminate having a reinforcing part and a laminated part was manufactured. Next, winding was inserted into a slot of the laminated core via an insulator, and then the winding was bent to manufacture a motor. No damage of the laminated core occurred due to the reinforcing part. The productivity of the motor therefore improved and the motor had a small loss as compared with a motor including a stator that was a conventional laminate of magnetic plates.

Example 2

Ribbons made of nanocrystalline soft magnetic alloy of 0.02 mm in thickness that was a perfect crystal were used as the first soft magnetic ribbons and the second soft magnetic ribbons, and a stator (laminated core) including a laminate having a reinforcing part and a laminated part was manufactured. In this example, not only the reinforcing part but also a part of the laminated part was impregnated with hardening resin. Next, winding was inserted into a slot of the laminated core via an insulator, and then the winding was bent to manufacture a motor. No damage of the laminated core occurred due to the reinforcing part. The productivity of the motor therefore improved and the motor had a small loss as compared with a motor including a stator that was a conventional laminate of magnetic plates.

Comparative Example 1

Similarly to Examples 1 and 2, ribbons made of nanocrystalline soft magnetic alloy of 0.02 mm in thickness that was a perfect crystal were used, and a stator (laminated core) including a laminate having a laminated part only and without a reinforcing part was manufactured. Next, winding was inserted into a slot of the laminated core via an insulator, and then the winding was bent. The laminated core including the laminated part only was damaged, and so this example failed to manufacture a motor.

Comparative Example 2

Similarly to Examples 1 and 2, ribbons made of nanocrystalline soft magnetic alloy of 0.02 mm in thickness that was a perfect crystal were used, and a laminated part was manufactured without a reinforcing part. Next the laminated part was immersed in hardening resin to impregnate areas between the neighboring ribbons stacked with the hardening resin and to cover the stacked ribbons as a whole with the hardening resin. Subsequently the hardening resin was hardened to manufacture a stator (laminated core) including the laminate having the laminated part only that was impregnated with the resin.

Next, winding was inserted into a slot of the laminated core via an insulator, and then the winding was bent to manufacture a motor. No damage of the laminate core occurred. The productivity of the motor therefore improved and the motor had a small loss as compared with a motor including a stator that was a conventional laminate of magnetic plates. The motor, however, had lower occupancy of nanocrystalline soft magnetic alloy ribbons and a larger laminated core than those of Examples 1 and 2.

DESCRIPTION OF SYMBOLS

1 Laminate
2 Laminated part
22 Insulating coating
21 First soft magnetic ribbon
3 Reinforcing part
31 Second soft magnetic ribbon
32 Hardening resin

What is claimed is:

1. A laminate of soft magnetic ribbons, the laminate comprising:
   a laminated part of first soft magnetic ribbons stacked, each of the first soft magnetic ribbons having an insulating coating on a face thereof; and
   a reinforcing part disposed at both ends of the laminated part in the stacking direction of the first soft magnetic ribbons, the reinforcing part including second soft magnetic ribbons stacked in the stacking direction of the first soft magnetic ribbons and hardening resin that covers the second soft magnetic ribbons as a whole and is impregnated into areas between the neighboring second soft magnetic ribbons.

2. The laminate of soft magnetic ribbons according to claim 1, wherein the first soft magnetic ribbons and the second soft magnetic ribbons are the same soft magnetic ribbons, and each of the first soft magnetic ribbons and the second soft magnetic ribbons have a thickness of 0.01 mm or more and 0.05 mm or less.

3. The laminate of soft magnetic ribbons according to claim 1, wherein the first soft magnetic ribbons at both ends in the stacking direction face the hardening resin of the reinforcing part.

4. The laminate of soft magnetic ribbons according to claim 2, wherein the first soft magnetic ribbons at both ends in the stacking direction face the hardening resin of the reinforcing part.

5. The laminate of soft magnetic ribbons according to claim 1, wherein each of the first soft magnetic ribbons and the second soft magnetic ribbons are nanocrystalline magnetic alloy ribbons.

6. The laminate of soft magnetic ribbons according to claim 2, wherein each of the first soft magnetic ribbons and the second soft magnetic ribbons are nanocrystalline magnetic alloys.

7. The laminate of soft magnetic ribbons according to claim 5, wherein the nanocrystalline magnetic alloy ribbons are manufactured by single-rolling and thermal-treating the ribbons.

8. The laminate of soft magnetic ribbons according to claim 6, wherein the nanocrystalline magnetic alloy ribbons are manufactured by single-rolling and thermal-treating the ribbons.

\* \* \* \* \*